Patented Sept. 27, 1932

1,879,538

UNITED STATES PATENT OFFICE

FRITZ SCHÖNHÖFER, OF ELBERFELD, GERMANY, ASSIGNOR TO WINTHROP CHEMICAL COMPANY, INC., OF NEW YORK, N. Y., A CORPORATION OF NEW YORK

QUINOLINE DERIVATIVE AND THE PROCESS OF PRODUCING THE SAME

No Drawing. Application filed February 7, 1931, Serial No. 514,310, and in Germany February 17, 1930.

This invention relates to new 5.6-dialkoxy-8-aminoquinolines, more particularly to compounds of the probable formula

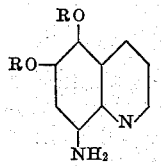

wherein R stands for an alkyl group such as methyl, ethyl, propyl, isopropyl, butyl and the like, and to a process of preparing the same.

In accordance with my invention the new 5.6-dialkoxy-8-aminoquinolines are produced by heating 5-halogen-6-alkoxy-8-nitroquinolines with a metal alcoholate, preferably aluminum alcoholate or an alkali alcoholate such as sodium- or potassium-methylate, -ethylate, -isopropylate or -isoamylate in a solvent, preferably an alcohol which corresponds to the metal alcoholate used, and reducing the 5.6-dialkoxy-8-nitroquinolines obtained in the customary manner to the corresponding 5.6-dialkoxy-8-aminoquinolines, for example by boiling with iron powder in an aqueous, acetic acid medium or with stannous chloride in acetic acid solution.

The reaction probably performs according to the following reaction scheme (R being an alkyl group):

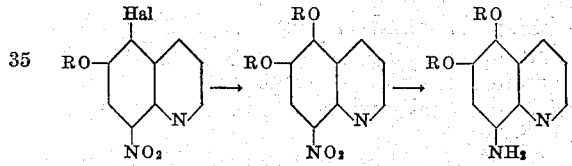

In this manner 8-aminoquinolines possessing similar or dissimilar alkoxy residues in the 5- and 6-positions are obtainable. The 5-halogen-6-alkoxy-8-nitroquinolines used as the starting material can be obtained, for example, by Skraup's quinoline synthesis from 1-amino-2-nitro-4-alkoxy-5-halogenbenzenes.

The 5.6-dialkoxy-8-aminoquinolines form yellow crystals which are insoluble in water, soluble in the usual organic solvents, such as ether, alcohol and acetone. With acids, for example hydrochloric, hydrobromic, nitric or acetic acid the new compounds form salts which in general are soluble in water.

The 5.6-dialkoxy-8-aminoquinolines have been found to be valuable intermediate products for the maunfacture of dyestuffs and therapeutical substances.

The invention is illustrated by the following examples, without being limited thereto:—

Example 1.—(a) 283 parts by weight of 5-bromo-6-methoxy-8-nitroquinoline are heated for 6 hours at 130–140° C. in a closed pressure vessel with a solution of 54 parts by weight of sodium methylate in 1600 parts by weight of methyl alcohol. After cooling the 5.6-dimethoxy-8-nitroquinoline in the form of long needles is filtered by suction. It melts at 126–128° C., the yield amounts to about 85%.

The same compound is obtained in a similar yield by boiling 238 parts by weight of 5-chloro-6-methoxy-8-nitroquinoline (melting point 202–205° C.) with a solution of 54 parts by weight of sodium methylate in 4000 parts by weight of methylalcohol during a period of some days and separating the reaction product after evaporation of excess methylalcohol as above indicated.

Instead of the quantity of 5-chloro-6-methoxy-8-nitroquinoline used 330 parts by weight of 5-iodo-6-methoxy-8-nitroquinoline (melting point 210–212° C.) may be employed whereby the 5.6-dimethoxy-8-nitroquinoline is obtained in an almost theoretical yield.

By working instead of with methylalcohol with, for example, isopropylalcohol, 5-isopropyloxy - 6 - methoxy - 8 - nitroquinoline, melting at 77–78° C., is obtained.

(b) 30 parts by weight of 5.6-dimethoxy-8-nitroquinoline are introduced slowly in the course of 3 hours into a boiling mixture of 300 parts by weight of iron powder, 500 parts of water and 2 parts by weight of glacial acetic acid. When the reaction is complete the resulting mass is rendered alkaline with potassium carbonate and the mixture is repeatedly extracted with ether. On evaporation of the ether the 5.6-dimethoxy-8-aminoquinoline crystallizes in light yellow crystals, melting at 148° C. The yield amounts to 80–90%.

By the application of the same process, for example, 5-isopropyloxy-6-methoxy-8-aminoquinoline of melting point 125–127° C. may be obtained.

In a similar manner the reduction can be carried out by means of stannous chloride in glacial acetic acid solution.

*Example 2.*—In accordance with the directions given under (*a*) in Example 1, 5-bromo-6-ethoxy-8-nitroquinoline is transformed by means of sodium methylate into 5-methoxy-6-ethoxy-8-nitroquinoline of melting point 86° C.

This nitro compound is reduced by means of iron powder in an aqueous solution containing acetic acid as described under (*b*) in Example 1 to 5-methoxy-6-ethoxy-8-aminoquinoline of melting point 119° C.

I claim:

1. In the process of preparing 5.6-dialkoxy-8-aminoquinolines the steps which comprise heating a 5-halogen-6-alkoxy-8-nitroquinoline with the alcoholate of a light metal in the presence of the corresponding alcohol and reducing the nitro group of the 5.6-dialkoxy-8-nitroquinoline produced to form the amino group.

2. In the process of preparing 5.6-dialkoxy-8-aminoquinolines the steps which comprise heating a 5-halogen-6-alkoxy-8-nitroquinoline with an alkali metal alcoholate in the presence of the corresponding alcohol and reducing the nitro group of the 5.6-dialkoxy-8-nitroquinoline produced to form the amino group.

3. In the process of preparing 5.6-dialkoxy-8-aminoquinolines the steps which comprise heating a 5-halogen-6-alkoxy-8-nitroquinoline with an alkali metal methylate in methylalcoholic solution and reducing the nitro group of the 5-methoxy-6-alkoxy-8-nitroquinoline produced to form the amino group.

4. In the process of preparing 5.6-dialkoxy-8-aminoquinolines the steps which comprise heating 5-bromo-6-methoxy-8-nitroquinoline with an alkali metal methylate in methylalcoholic solution and reducing the nitro group of the 5.6-dimethoxy-8-nitroquinoline produced to form the amino group.

5. In the process of preparing 5.6-dialkoxy-8-aminoquinolines the steps which comprise heating 5-bromo-6-methoxy-8-nitroquinoline with an alkali metal methylate in methylalcoholic solution to a temperature of 130–140° C. in a closed pressure vessel and reducing the nitro group of the 5.6-dimethoxy-8-nitroquinoline produced by heating with iron powder in an aqueous medium slightly acidified with acetic acid.

6. The process which comprises heating 283 parts by weight of 5-bromo-6-methoxy-6-nitroquinoline with a solution of 54 parts by weight of sodium methylate in 1600 parts by weight of methylalcohol for 6 hours at 130–140° C. in a closed pressure vessel and reducing 30 parts by weight of the 5.6-dimethoxy-8-nitroquinoline formed by introducing it during 3 hours into a boiling mixture of 300 parts by weight of iron powder, 500 parts by weight of water and 2 parts by weight of glacial acetic acid, rendering alkaline the reaction mixture after finishing the reduction, extracting the 5.6-dimethoxy-8-aminoquinoline produced by means of ether and evaporating the ether.

7. The compounds of the probable formula

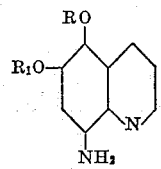

wherein R and $R_1$ stand for an alkyl group, said compounds being yellow crystals, insoluble in water, soluble in organic solvents, forming with acids salts which are in general soluble in water.

8. The compounds of the probable formula

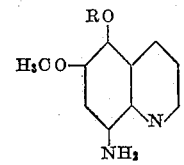

wherein R stands for an alkyl group, said compounds being yellow crystals, insoluble in water, soluble in organic solvents, forming with acids salts which are in general soluble in water.

9. The compounds of the probable formula

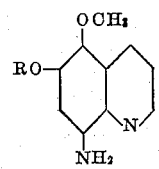

wherein R stands for an alkyl group, said compounds being yellow crystals, insoluble in water, soluble in organic solvents, forming with acids salts which are in general soluble in water.

10. The product of the probable formula

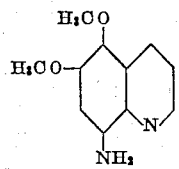

forming yellow crystals of melting point 148° C., being insoluble in water, soluble in organic solvents, forming with acids salts which are in general soluble in water.

11. The compound of the probable formula:

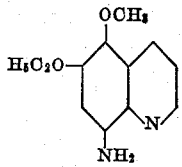

forming yellow crystals of the melting point 119° C., being insoluble in water, soluble in organic solvents, forming with acids salts which are in general soluble in water.

12. The compound of the probable formula:

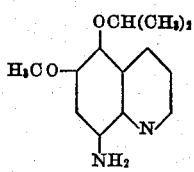

forming yellow crystals of the melting point 125–127° C., being insoluble in water, soluble in organic solvents, forming with acids salts which are in general soluble in water.

In testimony whereof, I affix my signature.

FRITZ SCHÖNHÖFER.